(12) United States Patent
Bell, Jr. et al.

(10) Patent No.: US 8,959,286 B2
(45) Date of Patent: Feb. 17, 2015

(54) HYBRID STORAGE SUBSYSTEM WITH MIXED PLACEMENT OF FILE CONTENTS

(71) Applicant: International Business Machines Corporation, Armonk, NY (US)

(72) Inventors: Robert H. Bell, Jr., Austin, TX (US); Men-Chow Chiang, Austin, TX (US); Hong L. Hua, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/854,484

(22) Filed: Apr. 1, 2013

(65) Prior Publication Data

US 2013/0218892 A1 Aug. 22, 2013

Related U.S. Application Data

(63) Continuation of application No. 12/644,721, filed on Dec. 22, 2009, now Pat. No. 8,438,334.

(51) Int. Cl.
*G06F 12/00* (2006.01)
*G06F 13/00* (2006.01)
*G06F 13/28* (2006.01)
*G06F 17/30* (2006.01)
*G06F 3/06* (2006.01)

(52) U.S. Cl.
CPC ........ *G06F 17/30082* (2013.01); *G06F 3/0611* (2013.01); *G06F 3/064* (2013.01); *G06F 3/0647* (2013.01); *G06F 3/0685* (2013.01)
USPC ............ 711/117; 711/103; 711/113; 711/160

(58) Field of Classification Search
USPC .................................. 711/103, 113, 117, 160
See application file for complete search history.

(56) References Cited

U.S. PATENT DOCUMENTS

| | | | |
|---|---|---|---|
| 5,860,083 A | 1/1999 | Sukegawa | |
| 2005/0010620 A1* | 1/2005 | Silvers et al. | 707/205 |
| 2007/0174546 A1 | 7/2007 | Lee | |
| 2007/0186039 A1 | 8/2007 | Nam | |
| 2008/0027905 A1 | 1/2008 | Jensen et al. | |
| 2008/0288714 A1 | 11/2008 | Saloman et al. | |

(Continued)

OTHER PUBLICATIONS

Jo, et al., "SSD-HDD Hybrid Virtual Disk in Consolidated Environments", EURO-PAR 2009 Parallel Processing Workshops, Aug. 2009, 10 pages (pp. 1-10 in pdf), Delft, Netherlands.

(Continued)

*Primary Examiner* — Michael Alsip
(74) *Attorney, Agent, or Firm* — Mitch Harris, Atty at Law, LLC; Andrew M. Harris; Parashos T. Kalaitzis (57) ABSTRACT

A storage subsystem combining solid state drive (SSD) and hard disk drive (HDD) technologies provides low access latency and low complexity. Separate free lists are maintained for the SSD and the HDD and blocks of file system data are stored uniquely on either the SSD or the HDD. When a read access is made to the subsystem, if the data is present on the SSD, the data is returned, but if the block is present on the HDD, it is migrated to the SSD and the block on the HDD is returned to the HDD free list. On a write access, if the block is present in the either the SSD or HDD, the block is overwritten, but if the block is not present in the subsystem, the block is written to the HDD.

20 Claims, 6 Drawing Sheets

(56) References Cited

U.S. PATENT DOCUMENTS

2009/0043831 A1 2/2009 Antonopoulis et al.
2009/0049234 A1 2/2009 Oh et al.
2009/0089343 A1 4/2009 Moore et al.

OTHER PUBLICATIONS

Jin, et al. "Efficient LRU Algorithm for Cache Scheduling in a Disk Array System", International Journal of Computers and Applications, Jan. 2000, pp. 134-139, vol. 22, No. 3, Anaheim, CA.
Office Action in U.S. Appl. No. 12/644,721, mailed on Jan. 2, 2012, 14 pages (pp. 1-14 in pdf).
Final Office Action in U.S. Appl. No. 12/644,721, mailed on May 3, 2012, 11 pages (pp. 1-11 in pdf).
Office Action in U.S. Appl. No. 12/644,721, mailed on Jul. 13, 2012, 13 pages (pp. 1-13 in pdf).
Final Office Action in U.S. Appl. No. 12/644,721, mailed on Nov. 1, 2012, 11 pages (pp. 1-11 in pdf).
Notice of Allowance in U.S. Appl. No. 12/644,721, mailed on Jan. 2, 2013, 7 pages (pp. 1-7 in pdf).
Xie, et al., "SAIL: Self-Adaptive File Reallocation on Hybrid Disk Arrays", High Performance Computing—HiPC 2008. Proceedings 15th International Conference, Dec. 2008, pp. 529-540, Bangalore, India.
Ajwani, et al., "Characterizing the performance of flash memory storage devices and its impact on algorithm design" Lecture Notes in Computer Science, Experimental Algorithms—7th International Workshop, WEA 2008, Proceedings, p. 208-219, May 2008, Springer Verlag, Berlin DE.
Jo, et al., "SSD-HDD Hybrid Virtual Disk in Consolidated Environments", EURO-PAR 2009 Parallel Processing Workshops, Aug. 2009, Delft, Netherlands.
Jin, et al. "Efficient LRU Algorithm for Cache Scheduling in a Disk Array System", International Journal of Computers and Applications, vol. 22, No. 3, Jan. 2000, Anaheim, CA.
Office Action in U.S. Appl. No. 12/644,721, mailed on Jan. 2, 2012.
Final Office Action in U.S. Appl. No. 12/644,721, mailed on May 3, 2012.
Office Action in U.S. Appl. No. 12/644,721, mailed on Jul. 13, 2012.
Final Office Action in U.S. Appl. No. 12/644,721, mailed on Nov. 1, 2012.
Notice of Allowance in U.S. Appl. No. 12/644,721, mailed on Jan. 2, 2013.

* cited by examiner

HYBRID STORAGE SUBSYSTEM WITH MIXED PLACEMENT OF FILE CONTENTS

The present Application is a Continuation of U.S. patent application Ser. No. 12/644,721, filed on Dec. 22, 2009 and claims priority thereto under 35 U.S.C. §120. The disclosure of the above-referenced Parent U.S. patent application is incorporated herein by reference.

BACKGROUND OF THE INVENTION

1. Field of the Invention

The present invention is related to storage systems within computer systems, and more specifically to a hybrid storage subsystem including multiple device types in which file contents are spread across the device types.

2. Description of Related Art

In computer storage subsystems, multiple levels of storage hierarchy are often provided due to differing latencies in the storage devices themselves. Cache memories provide fast access to data for processors, while main system memory provides typically larger storage at longer latencies. Hard disk drive (HDD) systems, which are generally implemented using magnetic storage technologies, provide a backing store for main system memory that has an even longer latency and typically a greater capacity. However, file accesses to HDD drive systems are directed at the HDD level. The HDD level may have its own cache that caches a portion of a file, but the entire file is located on the HDD and all or a portion of the file is cached when accessed frequently, after the first access has occurred.

Recently, solid-state drives (SSDs) build from non-volatile semiconductor memories, have reach reliability levels, capacities and costs, such that their use as replacements for HDDs is becoming practical. Hybrid SSD/HDD storage systems have been proposed and implemented in which frequently-accessed files are stored on SSDs, while files for which access demands are less frequent are stored on HDDs. However, such a strategy does not take into account the dynamic nature of file system access frequency due to various applications and operating systems that may be using a storage system over any given period.

Other techniques have been employed involve dynamic migration of disk contents based upon a least-recently-used (LRU) or other scheme that determines the relative access frequency of files and tables in order to migrate less frequently used files downward in the hierarchy, i.e., from the SSD portion of the disk/array to the HDD portion. Such a scheme improves efficiency, but large amounts of space may be wasted in the SSD if only a small portion of the file(s) remaining on the SSD are actually being accessed frequently. For example, a large database file may be the most frequently accessed file in a system, but only a small portion of the database may actually be undergoing access over a significant time interval.

A technique that could avoid the above-described problem is to use the SSD portion of the disk/array as a software cache. However, such an implementation introduces another layer of complexity to operating system software and another level of access latency into the system.

Therefore, it would be desirable to provide a management method and hybrid disk storage system that provides low average access latency along with low complexity.

BRIEF SUMMARY OF THE INVENTION

The invention is embodied in a computer-performed method, computer program product and computer system that manage a hybrid storage subsystem including a lower-latency block storage device and a higher-latency block storage device. The computer system is a computer system executing a program for carrying out the method and the computer program product is a program for carrying out the method.

The method maintains separate free lists for the lower-latency storage device and the higher-latency storage device and blocks of files are stored uniquely on either the lower-latency device or the higher-latency device. When a read access is made to the subsystem, if the data is present on the lower-latency device, the data is returned, but if the block is present on the higher-latency device, it is migrated to the lower-latency device and the block on the higher-latency device is returned to the higher-latency device free list. On a write access, if the block is present in the either the lower-latency device or higher-latency device, the block is overwritten, but if the block is not present in the subsystem, the block is written to the higher-latency device.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses hybrid storage subsystems and devices, in particular storage subsystems composed of multiple block storage devices of different latencies. In particular, in accordance with the embodiments of the present invention depicted herein, a longer latency block storage device, such as a hard disk drive (HDD), is used in conjunction with a shorter latency block storage device, such as a solid state drive (SSD) to form a hybrid storage subsystem. The longer latency block storage device and the shorter latency block storage device can be integrated within the same housing to provide a hybrid storage device having the advantages of the present invention.

Figure 1:
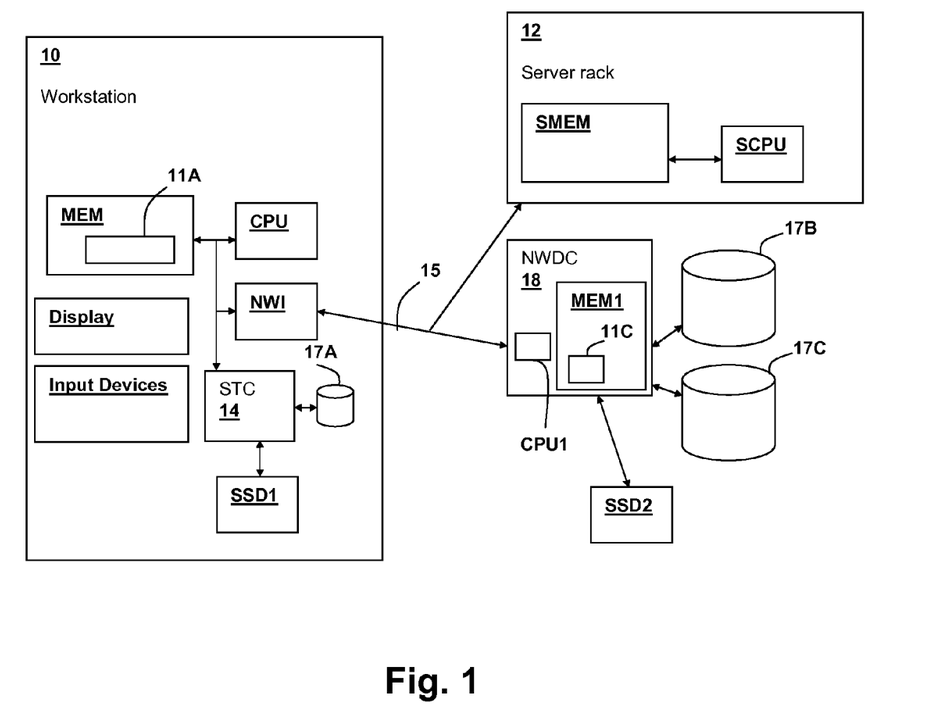
FIG. 1 is a block diagram illustrating a networked computer system including a storage subsystem in which techniques according to an embodiment of the present invention are practiced.

Referring now to FIG. 1, a networked computer system in which an embodiment of the present invention is practiced is depicted in a block diagram. A workstation computer system 10 includes a processor CPU coupled to a memory MEM that contains program instructions for execution by CPU, including a storage device driver 11A, which includes techniques in accordance with the present invention and further provides general storage functionality to a local operating system executed by CPU. Workstation computer 10 is also depicted as including a graphical display Display and input devices Input Devices, such as mice and keyboards, for interacting with user interfaces including user interfaces for interacting applications executing locally within workstation computer system 10 as well as applications executed by other computers connected to the network. Workstation computer system 10 also includes a storage controller STC 14 that interfaces processor CPU to local hard disk drive (HDD) storage device 17A and solid state drive (SSD) SSD1. Device driver 11A operates STC 14 to provide disc storage functionality within workstation computer system 10, and in particular, uses SSD SSD1 and HDD 17A in conjunction to form a hybrid storage subsystem in accordance with an embodiment of the present invention. Device driver 11A includes program instructions stored in memory MEM that form a computer program product in accordance with an embodiment of the invention. Workstation computer system 10 also includes a network interface NWI that couples workstation computer system 10 to a network 15, which may be fully wireless, fully wired or any type of hybrid network. Network storage is accessible via network interface NWI and is provided by a network disc controller (NWDC) 18. NWDC 18 couples remote storage such as HDDs 17B and 17C and SSD SSD2 to network 15 and includes a CPU CPU1, coupled to a memory MEM1 that stores a computer program product in accordance with an embodiment of the present invention in the form of program instructions for carrying out the techniques of the present invention in the form of a device driver 11C. Device driver 11C implements techniques in accordance with an embodiment of the present invention by operating HDDs 17B and 17C in conjunction with SSD SSD1 to form another hybrid storage subsystem in accordance with an embodiment of the present invention.

A server rack computer system 12, having at least one server memory SMEM and a server processor SCPU is also shown coupled to network 15, and which may also access the hybrid storage array provided by NWDC 18, and also, in some instances, the hybrid storage subsystem provided within workstation computer system 10 by SSD SSD1 and HDD 17A, if the storage volume(s) implemented by the hybrid storage subsystem by device driver 11A are shared on network 15. A system configuration as is generally used with the present invention may include a large number of workstation computer systems such as workstation 10 and a large number of server racks such a server rack 12. Storage within such a computer system may also generally include large arrays of storage devices. However, the techniques of the present invention are not dependent on scale and therefore can be practiced within smaller system configurations, as well.

Network 15 may include wireless local area networks (WLANs), wired local-area networks (LANs), wide-area networks (WANs) or any other suitable interconnection that provides communication between workstation computer system 10 and server rack 12, storage devices 17A-17C, SSDs SSD1 and SSD2, along with any other systems and devices coupled to network 15. Further, the present invention concerns backup and restore functionality that is not limited to a specific computer system or network configuration. Finally, the specification of workstation computer system 10, server rack 12, NWDC 18 and the location of their specific memories MEM, MEM1, SMEM and device drivers 11A and 11C does not imply a specific client-server relationship or hierarchical organization, as the techniques of the present invention may be employed in distributed systems in which no particular machine is identified as a server, but at least one of the machines provides an instance and functionality of a program or object, such as a device driver that implements a hybrid storage subsystem or device in accordance with an embodiment of the present invention.

Figure 2:
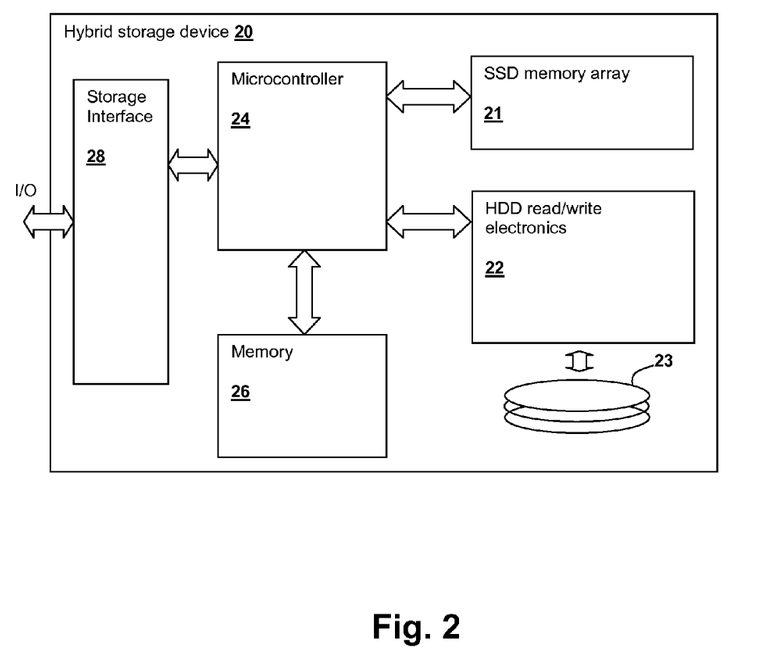
FIG. 2 is a block diagram of a storage device accordance with an embodiment of the present invention.

Referring now to FIG. 2, a hybrid storage device 20, in accordance with an embodiment of the present invention is illustrated. Hybrid storage device 20 includes all of the functionality of a hybrid storage subsystem in accordance with the present invention, and therefore could be used in the system depicted in FIG. 1 without requiring a special device driver or separate SSD and HDD drives. A microcontroller 24 executes program instructions stored in a memory 26. The program instructions are generally stored in a non-volatile portion of memory 26, such as FLASH memory. A storage interface 28, such as a small computer systems interface (SCSI) or a serial AT attachment (SATA) interface, provides connection to a storage controller of a computer system, such as STC 14 of workstation computer system 10 in FIG. 1. Hybrid storage device 20 includes a lower-latency block device, e.g., a SSD memory array 21 and a higher-latency storage device, e.g., a set of HDD platters/heads 23 interfaced via HDD read/write electronics 22. HDD read/write electronics 22 differs from HDDs such as HDDs 17A-17C of FIG. 1 in that the storage interface typically used to connect the internal storage of HDDs 17A-17C to STC 14 is not needed between HDD read/write electronics 22 and microcontroller 24, and therefore storage interface 28 is shared in common with the HDD and SSD portions of hybrid storage device 20. Further, the algorithms implementing the storage device emulation in a typical SSD are implemented by microcontroller 24 and therefore SSD memory array 21 represents just the storage provided for SSD implementation, and does not require the other logic and controllers that a fully-implemented separate SSD drive would contain.

As illustrated microcontroller 24, under control of a computer program product in accordance with an embodiment of the present invention stored within memory 26, receives access requests and other commands via storage interface 28. Microcontroller 24 accesses semiconductor storage devices within SSD memory array 21 or HDD platters/heads 23 via HDD read/write electronics 22 to provide the functionality of a hybrid disk array having a very high throughput. The operation of a hybrid disk control program in memory 26, which are essentially the same methodologies employed by device drivers 11A and 11C of FIG. 1, are described in further detail below.

Figure 3:
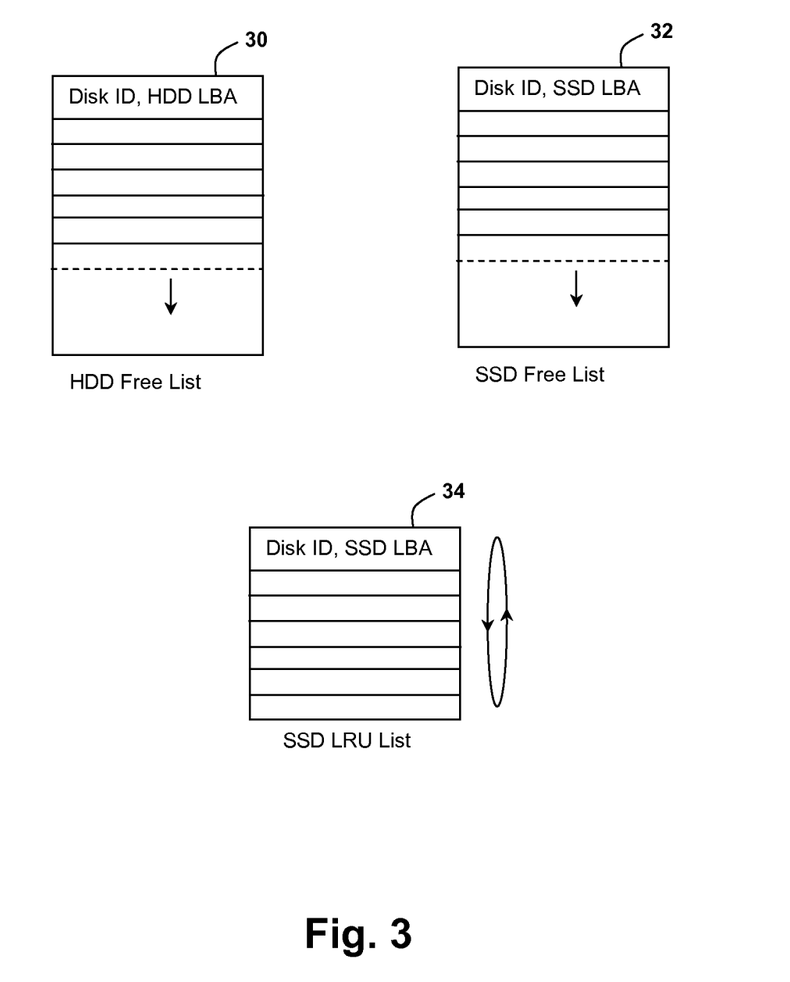
FIG. 3 is a pictorial diagram depicting an organization of data structures in a program in accordance with an embodiment of the present invention.

Referring now to FIG. 3, data structures used by the hybrid disk control programs in the system of FIG. 1 and the storage device of FIG. 2 are shown. Two free lists are maintained: an HDD free list 30 and an SSD free list 32. Entries in free lists 30, 32 contain at least a device identifier such as a disk identifier (ID) or a logical unit number (LUN) for the device within the storage sub-system and a location of the block represented by the entry on the storage device, such as a logical block address (LBA). The disk ID can be omitted in implementations where only one SSD and one HDD device are present. By including separate free lists at the block level for both the SSD and HDD devices, blocks can be easily migrated between the different types of devices and the location of the contents of a file can be mixed across the different types of devices, while storing each block uniquely on one of the devices. Therefore, the storage subsystem of the present invention is not an inclusive hierarchy, but is rather a subsystem managed to locate more frequently accessed data in a lower-latency (and generally more costly) storage device, such as an SSD, while generally providing a larger amount of storage in a higher-latency storage device such as an HDD, for economy. It is understood that the systems and schemes described above will generally apply to storage devices of different latencies, and the use of SSD and HDD devices/storage arrays, except when attention is drawn to a particular claimed embodiment, are exemplary and should be understood to encompass other hybrid storage subsystems and devices that use the techniques of the present invention as described below. A least-recently-used (LRU) list 34 is used in the exemplary embodiment to store a list of the currently allocated blocks in the SSD. The entries are ordered by their last access time, or by another schema as generally used to implement a cast-out scheme such as LRU. The list is updated as blocks are accessed and is shortened as blocks of data are removed from the SSD and transferred to the HDD. Alternatively, the positions of the entries in the list can remain fixed, and a value stored in each entry is used to provide an indication of the LRU ranking of the entry. Other schemes such as most-recently-used (MRU) may be employed and are contemplated as being within the scope of the present invention.

Figure 4:
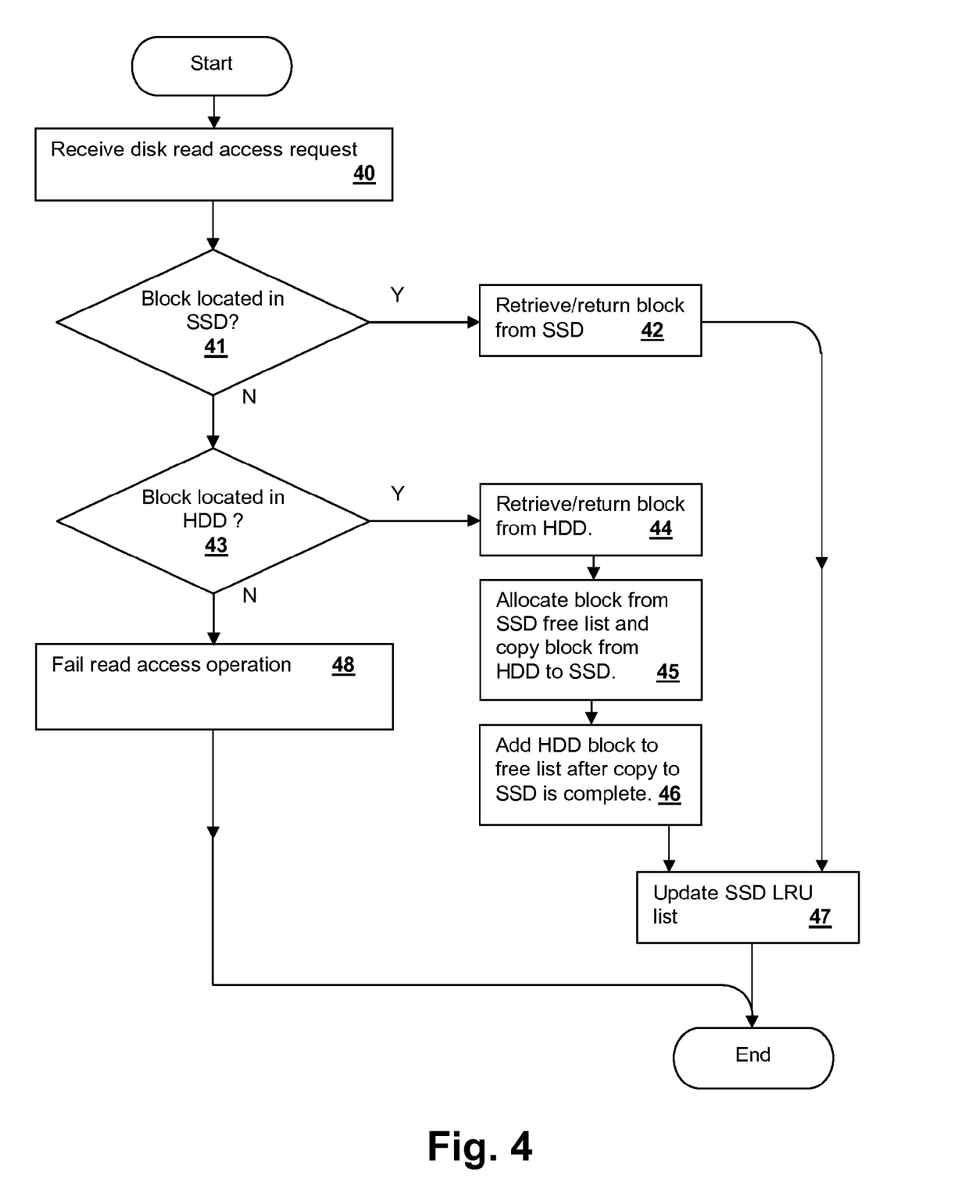
FIG. 4 is a flow chart of a write access operation as performed in a storage subsystem in accordance with an embodiment of the present invention.

Referring now to FIG. 4, a read access method, in accordance with an embodiment of the invention, is depicted in a flowchart. A disk read access request is received (step 40) and if the requested block is located in the SSD (decision 41), then the block is retrieved and returned from the SSD in response to the read access request (step 42). The SSD LRU list is updated to reflect the read access (step 47) and no further action is taken. If the requested block is not located in the SSD (decision 41), then a check is performed to determine if the block is present in the HDD (decision 43) and if not, the read access operation fails (step 48). Otherwise, if the block is present in the HDD (decision 43), the block is retrieved from the HDD and returned in response to the read access request (step 44). A block from the SSD free list is allocated and the block is copied from the HDD to the SSD (step 45), and finally the HDD block is added to the HDD free list once the copy is complete (step 46). The SSD LRU list is then updated to reflect the read access (step 47). The SSD allocation and copying described above may be performed in the context of the read requestor, or may be scheduled after the block has been returned. In particular, since the contents of the block are being transferred to the SSD during the copy, it may be desirable to pre-allocate the block from the SSD free list and transfer the block's data from the HDD to both an interface output buffer or direct memory access (DMA) target and the SSD storage device at the same time.

Figure 5:
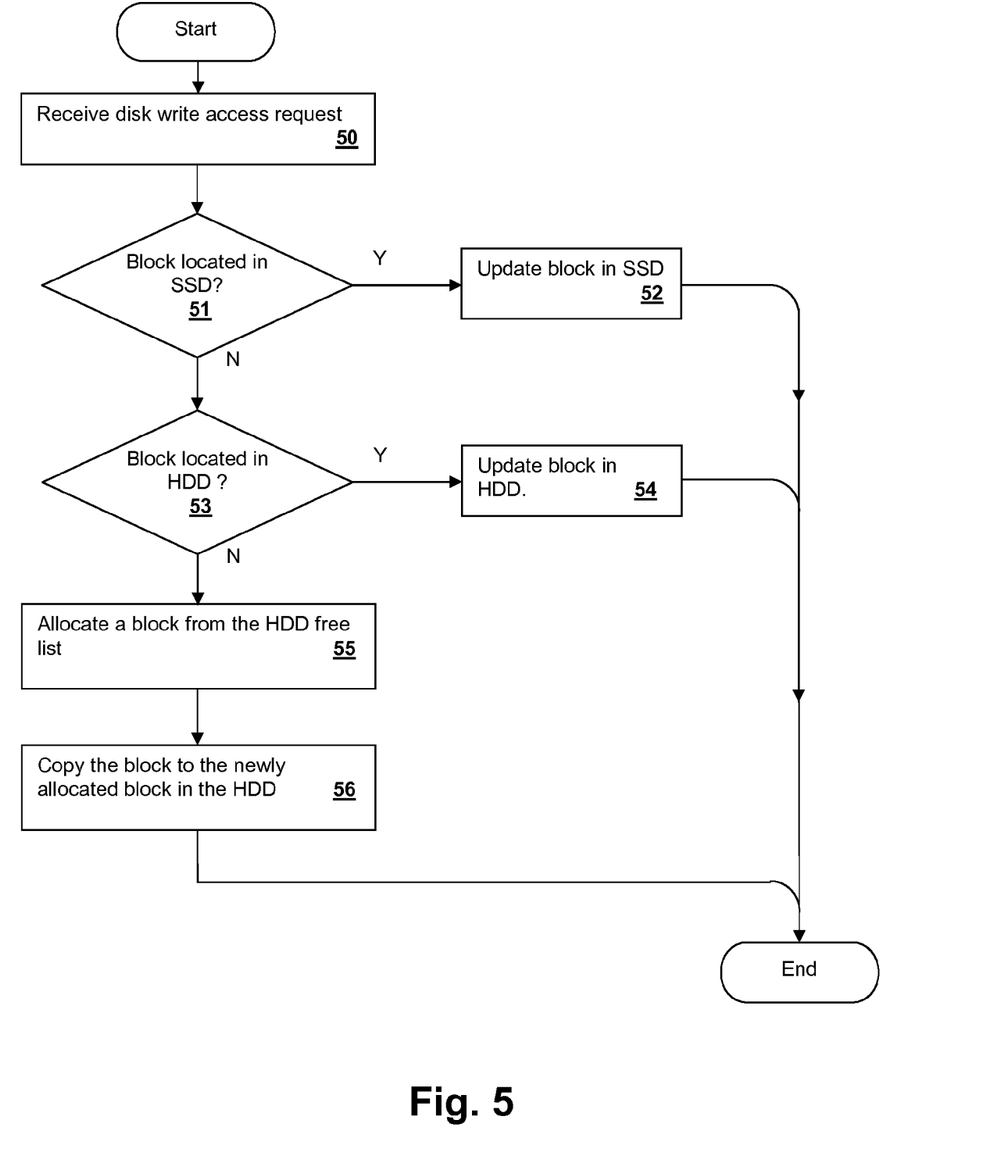
FIG. 5 is a flow chart of a read access operation as performed in a storage subsystem in accordance with an embodiment of the present invention.

Referring now to FIG. 5, a write access method, in accordance with an embodiment of the invention, is depicted in a flowchart. A disk write access request is received (step 50) and if the specified block is located in the SSD (decision 51), then the block is updated in the SSD by over-writing the SSD block contents (step 52) and no further action is taken. If the specified block is not located in the SSD (decision 51), then a check is performed to determine if the block is present in the HDD (decision 53) and if not, a HDD block is allocated from the HDD free list (step 55) and the block is copied to the newly-allocated block in the HDD (step 56). Otherwise, if the block is present in the HDD (decision 53), the block is updated in the HDD by over-writing the HDD block contents (step 54). The above-described method differs from the read access methodology in that no migration of a block from the HDD to the SSD is performed on a write access. Since SSD devices generally have higher average write latencies than read latencies, especially when writing large amounts of data, performing write operations to the HDD will improve performance when the blocks are also not being read during the same time period.

Figure 6:
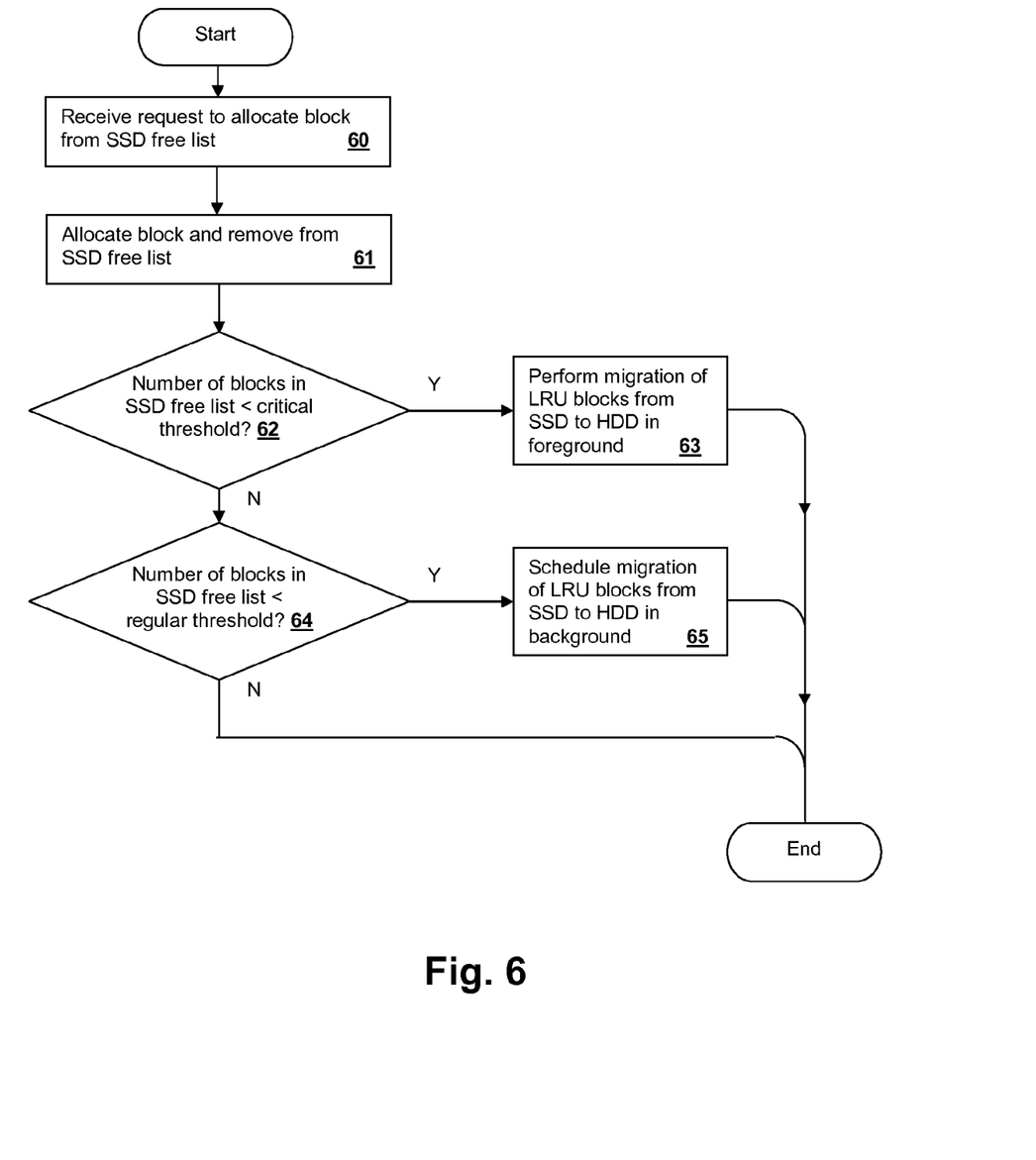
FIG. 6 is a flow chart of a migration operation as performed in a storage subsystem in accordance with an embodiment of the present invention.

Since the method depicted in FIG. 4 will tend to fill up the SSD with most-recently read blocks and since read accesses from the HDD require a free SSD block in order to perform the copy operation in step 45, it is desirable to have a mechanism for maintaining a certain level of free space on the SSD. Referring now to FIG. 6, a method for freeing blocks on the SSD is depicted in a flowchart, in accordance with an embodiment of the invention. When a request is received to allocate a block from the SSD free list (step 60), e.g., as triggered by step 44 of FIG. 4, the block is allocated and removed from the free list (step 61) as in step 45 of FIG. 4. If the number of blocks in the SSD free list is less than a critical threshold (decision 62), then a migration of LRU blocks from the SSD is made to the HDD (step 63), immediately. The critical threshold is the minimum number of free blocks that the system attempts to maintain in the SSD under all conditions. If the number of blocks in the SSD free list is greater than or equal to the critical threshold (decision 62), then if the number of blocks in the SSD free list is greater than or equal to a regular threshold value (decision 64), then no migration is performed. If the number of blocks in the HDD free list is less than the regular threshold value (decision 64), then migration of LRU blocks from the SSD is scheduled in background.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer-performed method of managing a storage subsystem including a lower-latency block storage device and a higher-latency block storage device, the method comprising:

receiving a file read access operation request implicating multiple blocks of a single file corresponding to the file read access operation, wherein if the file implicated by the file access operation request is present in the storage subsystem, individual ones of the multiple blocks are stored exclusively either on the lower-latency block storage device or the higher-latency block storage device, wherein a first set of the multiple blocks corresponding to a first portion of the file are stored on the lower-latency block storage device, and wherein a second set of the multiple blocks corresponding to a second portion of the file and exclusive of the first portion of the file are stored on the higher-latency block storage device simultaneously with the first set of the multiple blocks being stored on the lower-latency block storage device;

specifying a next block in the file implicated by the request as a given block;

determining whether the given block is present in the lower-latency block storage device;

responsive to determining that the given block is present in the lower-latency block storage device, accessing the given block at the lower-latency block storage device;

responsive to determining that the given block is not present in the lower-latency block storage device, accessing the given block at the higher-latency block storage device to copy the given block to the lower-latency block storage device and remove the given block from the higher-latency block storage device;

repeating the specifying, determining and accessing for following blocks implicated by the file access operation request until a last block implicated by the file read access operation request has been accessed;

receiving a file write access operation request implicating other multiple blocks;

specifying a next block in another file implicated by the write request as another given block;

determining whether the another given block is present in either of the lower-latency block storage device or the higher-latency block storage device;

responsive to determining that the another given block is not present in the lower-latency block storage device nor the higher-latency block storage device, allocating a new block on the higher-latency block storage device; and responsive to allocating the new block on the higher-latency block storage device, writing the data provided with the write operation only to the new block, wherein if the another given block is not present in either of the lower-latency block storage device or the higher-latency block storage device, the data provided with the write operation is always written exclusively to the higher-latency block storage device, whereby the another given block is stored exclusively on the higher-latency block storage device.

2. The computer-performed method of claim 1, wherein the lower-latency block storage device is a solid-state disk drive, and wherein the higher-latency block storage device is a hard-disk drive.

3. The method of claim 2, wherein the method further comprises:

for each given block, responsive to determining that the given block is not present in the solid state drive, determining whether or not the given block is present in the hard disk drive;

responsive to determining that the given block is present in the hard disk drive, allocating a block in the solid state drive from a free list of the solid state drive;

further responsive to determining that the given block is present in the hard disk drive, copying the contents of the given block from the hard disk drive to the solid state drive;

responsive to completing the copying, adding the given block to a free list of the hard disk drive; and returning the contents of the given block in response to the read operation.

4. The method of claim 3, further comprising responsive to determining that the given block is present in the solid state drive or present in the hard disk drive, updating a least-recently-used list of the solid state drive.

5. The method of claim 2, wherein the method further comprises:

for each given block, responsive to determining that the given block is not present in the solid state drive, determining whether or not the given block is present in the hard disk drive;

responsive to determining that the given block is present in the hard disk drive, allocating a block in the solid state drive from a free list of the solid state drive;

further responsive to determining that the given block is present in the hard disk drive, copying the contents of the given block from the hard disk drive to the solid state drive;

responsive to completing the copying, adding the given block to a free list of the hard disk drive; and returning the contents of the given block in response to the read operation.

6. A computer system comprising:

a processor for executing program instructions;

a memory coupled to the processor for storing the program instructions; and the program instructions, stored within the memory, for managing a storage subsystem including a lower-latency block storage device and a higher-latency block storage device, wherein the program instructions comprise program instructions for:

receiving a file read access operation request implicating multiple blocks of a single file corresponding to the file read access operation, wherein if the file implicated by the file access operation request is present in the storage subsystem, individual ones of the multiple blocks are stored exclusively either on the lower-latency block storage device or the higher-latency block storage device, wherein a first set of the multiple blocks corresponding to a first portion of the file are stored on the lower-latency block storage device, and wherein a second set of the multiple blocks corresponding to a second portion of the file exclusive of the first portion of the file are stored on the higher-latency block storage device simultaneously with the first set of the multiple blocks being stored on the lower-latency block storage device;

specifying a next block in the file implicated by the request as a given block;

determining whether the given block is present in the lower-latency block storage device;

responsive to determining that the given block is present in the lower-latency block storage device, accessing the given block at the lower-latency block storage device;

responsive to determining that the given block is not present in the lower-latency block storage device, accessing the given block at the higher-latency block storage device to copy the given block to the lower-latency block storage device and remove the given block from the higher-latency block storage device;

repeating the specifying, determining and accessing for following blocks implicated by the file access operation request until a last block implicated by the file access operation request has been accessed;

receiving a file write access operation request implicating other multiple blocks;

specifying a next block in another file implicated by the write request as another given block;

determining whether the another given block is present in either of the lower-latency block storage device or the higher-latency block storage device;

responsive to determining that the another given block is not present in the lower-latency block storage device nor the higher-latency block storage device, allocating a new block on the higher-latency block storage device; and responsive to allocating the new block on the higher-latency block storage device, writing the data provided with the write operation only to the new block, wherein if the another given block is not present in either of the lower-latency block storage device or the higher-latency block storage device, the data provided with the write operation is always written exclusively to the higher-latency block storage device, whereby the another given block is stored exclusively on the higher-latency block storage device.

7. The computer system of claim 6, wherein the lower-latency block storage device is a solid-state disk drive, and wherein the higher-latency block storage device is a hard-disk drive.

8. The computer system of claim 7, wherein the program instructions further comprise program instructions for:
for each given block, responsive to determining that the given block is not present in the solid state drive, determining whether or not the given block is present in the hard disk drive;
responsive to determining that the given block is present in the hard disk drive, allocating a block in the solid state drive from a free list of the solid state drive;
further responsive to determining that the given block is present in the hard disk drive, copying the contents of the given block from the hard disk drive to the solid state drive;
responsive to completing the copying, adding the given block to a free list of the hard disk drive; and
returning the contents of the given block in response to the read operation.

9. The computer system of claim 8, further comprising responsive to determining that the given block is present in the solid state drive or present in the hard disk drive, updating a least-recently-used list of the solid state drive.

10. The computer system of claim 7, wherein the program instructions further comprise program instructions for:
for each given block, responsive to determining that the given block is not present in the solid state drive, determining whether or not the given block is present in the hard disk drive;
responsive to determining that the given block is present in the hard disk drive, allocating a block in the solid state drive from a free list of the solid state drive;
further responsive to determining that the given block is present in the hard disk drive, copying the contents of the given block from the hard disk drive to the solid state drive;
responsive to completing the copying, adding the given block to a free list of the hard disk drive; and
returning the contents of the given block in response to the read operation.

11. A computer program product comprising a computer-readable storage device storing program instructions for execution within a computer system, wherein the program instructions include program instructions for managing a storage subsystem including a lower-latency block storage device and a higher-latency block storage device, wherein the program instructions comprise:
program instructions for receiving a file read access operation request implicating multiple blocks of a single file corresponding to the file read access operation, wherein if the file implicated by the file access operation request is present in the storage subsystem, individual ones of the multiple blocks are stored exclusively either on the lower-latency block storage device or the higher-latency block storage device, wherein a first set of the multiple blocks corresponding to a first portion of the file are stored on the lower-latency block storage device, and wherein a second set of the multiple blocks corresponding to a second portion of the file exclusive of the first portion of the file are stored on the higher-latency block storage device simultaneously with the first set of the multiple blocks being stored on the lower-latency block storage device;
program instructions for specifying a next block in the file implicated by the request as a given block;
program instructions for determining whether the given block is present in the lower-latency block storage device;
program instructions for responsive to determining that the given block is present in the lower-latency block storage device, accessing the given block at the lower-latency block storage device;
program instructions for responsive to determining that the given block is not present in the lower-latency block storage device, accessing the given block at the higher-latency block storage device to copy the given block to the lower-latency block storage device and remove the given block from the higher-latency block storage device;
program instructions for repeating the specifying, determining and accessing for following blocks implicated by the file access operation request until a last block implicated by the file access operation request has been accessed;
program instructions for receiving a file write access operation request implicating other multiple blocks;
program instructions for specifying a next block in another file implicated by the write request as another given block;
program instructions for determining whether the another given block is present in either of the lower-latency block storage device or the higher-latency block storage device;
program instructions for, responsive to determining that the another given block is not present in the lower-latency block storage device nor the higher-latency block storage device, allocating a new block on the higher-latency block storage device; and
program instructions for, responsive to allocating the new block on the higher-latency block storage device, writing the data provided with the write operation only to the new block, wherein if the another given block is not present in either of the lower-latency block storage device or the higher-latency block storage device, the data provided with the write operation is always written exclusively to the higher-latency block storage device, whereby the another given block is stored exclusively on the higher-latency block storage device.

12. The computer program product of claim 11, wherein the lower-latency block storage device is a solid-state disk drive, and wherein the higher-latency block storage device is a hard-disk drive.

13. The computer program product of claim 12, wherein the program instructions further comprise:
program instructions for, for each given block, responsive to determining that the given block is not present in the solid state drive, determining whether or not the given block is present in the hard disk drive;
program instructions for, responsive to determining that the given block is present in the hard disk drive, allocating a block in the solid state drive from a free list of the solid state drive;
program instructions for, further responsive to determining that the given block is present in the hard disk drive, copying the contents of the given block from the hard disk drive to the solid state drive;
program instructions for, responsive to completing the copying, adding the given block to a free list of the hard disk drive; and program instructions for, returning the contents of the given block in response to the read operation.

14. The computer program product of claim 13, further comprising responsive to determining that the given block is present in the solid state drive or present in the hard disk drive, updating a least-recently-used list of the solid state drive.

15. The computer program product of claim 12, wherein the program instructions further comprise:
    program instructions for, for each given block, responsive to determining that the given block is not present in the solid state drive, determining whether or not the given block is present in the hard disk drive;
    program instructions for responsive to determining that the given block is present in the hard disk drive, allocating a block in the solid state drive from a free list of the solid state drive;
    program instructions for further responsive to determining that the given block is present in the hard disk drive, copying the contents of the given block from the hard disk drive to the solid state drive;
    program instructions for responsive to completing the copying, adding the given block to a free list of the hard disk drive; and
program instructions for returning the contents of the given block in response to the read operation.

16. A storage device, comprising
    a lower-latency storage block storage device;
    a higher-latency storage block storage device;
    a processor for executing program instructions;
    a memory for storing the program instructions, and wherein the program instructions comprise program instructions for receiving a file read access operation request implicating multiple blocks of a single file corresponding to the file read access operation, wherein if the file implicated by the file access operation request is present in the storage subsystem, individual ones of the multiple blocks are stored exclusively either on the lower-latency block storage device or the higher-latency block storage device, wherein a first set of the multiple blocks corresponding to a first portion of the file are stored on the lower-latency block storage device, and wherein a second set of the multiple blocks corresponding to a second portion of the file and exclusive of the first portion of the file are stored on the higher-latency block storage device simultaneously with the first set of the multiple blocks being stored on the lower-latency block storage device, specifying a next block in the file implicated by the request as a given block, determining whether the given block is present in the lower-latency block storage device, responsive to determining that the given block is present in the lower-latency block storage device, accessing the given block at the lower-latency block storage device, responsive to determining that the given block is not present in the lower-latency block storage device, accessing the given block at the higher-latency block storage device to copy the given block to the lower-latency storage block storage device and remove the given block from the higher-latency storage block storage device, repeating the specifying, determining and accessing for following blocks implicated by the file access operation request until a last block implicated by the file access operation request has been accessed, receiving a file write access operation request implicating other multiple blocks, specifying a next block in another file implicated by the write request as another given block, determining whether the another given block is present in either of the lower-latency block storage device or the higher-latency block storage device, responsive to determining that the another given block is not present in the lower-latency block storage device nor the higher-latency block storage device, allocating a new block on the higher-latency block storage device, responsive to allocating the new block on the higher-latency block storage device, writing the data provided with the write operation only to the new block, wherein if the another given block is not present in either of the lower-latency block storage device or the higher-latency block storage device, the data provided with the write operation is always written exclusively to the higher-latency block storage device, whereby the another given block is stored exclusively on the higher-latency block storage device.

17. The storage device of claim 16, wherein the lower-latency block storage device is a solid-state drive, and wherein the higher-latency block storage device is a hard-disk drive.

18. The storage device of claim 17, wherein the program instructions further comprise program instructions for:
    for each given block, responsive to determining that the given block is not present in the solid state drive, determining whether or not the given block is present in the hard disk drive;
    responsive to determining that the given block is present in the hard disk drive, allocating a block in the solid state drive from a free list of the solid state drive;
    further responsive to determining that the given block is present in the hard disk drive, copying the contents of the given block from the hard disk drive to the solid state drive;
    responsive to completing the copying, adding the given block to a free list of the hard disk drive; and
    returning the contents of the given block in response to the read operation.

19. The storage device of claim 18, further comprising responsive to determining that the given block is present in the solid state drive or present in the hard disk drive, updating a least-recently-used list of the solid state drive.

20. The storage device of claim 17, wherein the program instructions further comprise program instructions for:
    for each given block, responsive to determining that the given block is not present in the solid state drive, determining whether or not the given block is present in the hard disk drive;
    responsive to determining that the given block is present in the hard disk drive, allocating a block in the solid state drive from a free list of the solid state drive;
    further responsive to determining that the given block is present in the hard disk drive, copying the contents of the given block from the hard disk drive to the solid state drive;
    responsive to completing the copying, adding the given block to a free list of the hard disk drive; and
    returning the contents of the given block in response to the read operation.

* * * * *